US 8,874,859 B2

(12) United States Patent
Vilayannur et al.

(10) Patent No.: US 8,874,859 B2
(45) Date of Patent: Oct. 28, 2014

(54) GUEST FILE SYSTEM INTROSPECTION AND DEFRAGMENTABLE VIRTUAL DISK FORMAT FOR SPACE EFFICIENCY

(75) Inventors: Murali Vilayannur, San Jose, CA (US); Krishna Yadappanavar, Sunnyvale, CA (US); Faraz Shaikh, Mountain View, CA (US); Manjunath Rajashekhar, San Francisco, CA (US); Satyam B. Vaghani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 706 days.

(21) Appl. No.: 12/976,123

(22) Filed: Dec. 22, 2010

(65) Prior Publication Data
US 2012/0167080 A1    Jun. 28, 2012

(51) Int. Cl.
*G06F 13/00*    (2006.01)

(52) U.S. Cl.
USPC .......................................... 711/159; 711/103

(58) Field of Classification Search
USPC ........................................................ 711/103
See application file for complete search history.

(56) References Cited

U.S. PATENT DOCUMENTS

| 5,604,902 | A  | * | 2/1997  | Burkes et al. ........................ 1/1 |
| 6,185,665 | B1 | * | 2/2001  | Owada et al. ................. 711/170 |
| 7,725,506 | B1 | * | 5/2010  | Stringham ..................... 707/822 |
| 2010/0057818 | A1 | * | 3/2010 | Gao et al. ...................... 707/813 |
| 2010/0235831 | A1 | * | 9/2010 | Dittmer ............................ 718/1 |
| 2010/0280996 | A1 | * | 11/2010 | Gross et al. .................. 707/649 |
| 2011/0197022 | A1 | * | 8/2011 | Green et al. .................. 711/112 |

OTHER PUBLICATIONS

"VMware Virtual Disks—Virtual Disk Format 1.1" VMware Technical Note, VMware, Inc., Palo Alto, CA, pp. 1-18, 2007.

* cited by examiner

*Primary Examiner* — April Y Blair
*Assistant Examiner* — Trang Ta

(57) ABSTRACT

A virtualized computer system employs a virtual disk with a space efficient (SE) format to store data for virtual machines running therein. The SE format allows for defragmentation at a fine-grained level, where unused, stale, and zero blocks are moved to the end of the virtual disk so that the virtual disk may be truncated and space reclaimed by the underlying storage system as part of a special defragmentation process.

28 Claims, 11 Drawing Sheets

GUEST FILE SYSTEM INTROSPECTION AND DEFRAGMENTABLE VIRTUAL DISK FORMAT FOR SPACE EFFICIENCY

BACKGROUND

Computer virtualization is a technique that involves encapsulating a physical computing machine platform into a virtual machine that is executed under the control of virtualization software on a hardware computing platform, or "host." A virtual machine has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine uses the virtual disk in the same manner that a physical storage drive is used, to store the guest operating system, application programs, and application data.

The virtualization software, also referred to as a hypervisor, manages the guest operating system's access to the virtual disk and maps the virtual disk to the underlying physical storage resources that reside on the host platform or in a remote storage device, such as a storage area network (SAN) or network attached storage (NAS). Because multiple virtual machines can be instantiated on a single host, allocating physical storage space for virtual disks corresponding to every instantiated virtual machine in an organization's data center can stress the physical storage space capacity of the data center. For example, when provisioning a virtual disk for a virtual machine, the virtualization software may allocate all the physical disk space for the virtual disk at the time the virtual disk is initially created, sometimes creating a number of empty data blocks containing only zeroes ("zero blocks"). However, such an allocation may result in storage inefficiencies because the physical storage space allocated for the virtual disk may not be timely used (or ever used) by the virtual machine. In one solution, known as "thin provisioning," virtualization software dynamically allocates physical storage space to a virtual disk only when such physical storage space is actually needed by the virtual machine and not necessarily when the virtual disk is initially created.

Storage inefficiencies may also be caused by an accumulation of "stale" data in the virtual disk, i.e., disk blocks that were previously used but are currently unused by the guest operating system. For example, deletion of a file, such as a temporary file created as a backup during editing of a document, in the virtual disk by the guest operating system does not generally result in a release of the actual data blocks corresponding to the temporary file. While the guest operating system may itself track the freed data blocks relating to the deleted temporary file in its own guest file system (e.g., by clearing bits in a bitmap for the guest file system), the guest operating system is not aware that the disk on which it has deleted the temporary data file is actually a "virtual disk" that is itself a file. This file is stored in a "virtual machine" level file system (hereinafter sometimes referred to as a "virtual machine file system") that is implemented and imposes an organizational structure in a logical unit number (LUN) of a storage device. Therefore, although a portion (i.e., the portion of the virtual disk that stores the guest file system's bitmap of freed data blocks) of the virtual disk may be modified upon a deletion of the temporary file by the guest operating system, the portion of the virtual disk corresponding to actual data blocks of the deleted temporary file does not actually get freed in the virtual machine file system. This behavior can result in storage inefficiencies because such "stale" portions of the virtual disk are not utilized by the corresponding guest operating system and are also not available to the virtual machine file system for alternative uses (e.g., reallocated as part of a different virtual disk for a different virtual machine, etc.). The foregoing stale data phenomenon can be additionally complicated due to the difficulty in reclaiming data blocks because of possible "impedance mismatches" of guest operating system block size, which may be 4 KB, and virtual disk block size, which may be 1 MB. As such, even if a guest operating system expressly de-allocates certain data blocks in its guest file system (e.g., of 4 KB size), corresponding virtual machine file system data blocks within the virtual disk (e.g., of 1 MB size) at the virtual machine file system may be too large to deallocate and may further contain data corresponding to other data blocks at the guest file system level that remain in use, a phenomena typically referred to in the art as "false sharing" due to block size artifacts.

SUMMARY

One or more embodiments of the invention provide techniques for managing storage within a virtualized system. According to the embodiments described herein, a hypervisor creates and manages a virtual disk with a "space efficient" virtual disk format. In accordance with the virtual disk format, data is stored in the virtual disk as granular units of data referred to as "grains." For example, as used in certain embodiments described herein, a grain refers to a data block (e.g., 4 KB size data block, etc.) utilized by a guest operating system of a virtual machine when allocating or deallocating data blocks to files stored on its virtual disk. In contrast, a "virtual machine file system data block" as used herein refers to a data block (e.g., 1 MB size data block, etc.) utilized by the hypervisor when allocating or deallocating data blocks to files stored in a LUN, such as the file representing the virtual disk, and a "sector" as used herein refers to a data block (e.g., of 512 bytes, etc.) utilized by the hypervisor when issuing sector-level commands (e.g., SCSI write, etc.) to a networked remote storage device or local storage device, as the case may be, that stores the virtual machine file system (although it should be recognized that alternative embodiments may utilize grain, data block, virtual machine file system data block and sector sizes different from such data block sizes). A "defragmentation" process moves unused grains to the end of the virtual disk so that the virtual disk can be truncated and space can be reclaimed by the virtual machine file system. The present disclosure describes a space efficient virtual disk format, the defragmentation process, and other supporting processes, techniques, and operations.

One or more embodiments of the invention provide techniques for managing disk storage in a computing system running one or more virtual machines. One such embodiment truncates a file stored on a virtual machine file system supporting execution of virtual machines, wherein the file represents a virtual disk of a virtual machine and the virtual machine includes a guest file system that stores data on the virtual disk. The method for such an embodiment comprises identifying a first data block of the virtual disk that is located closer to an end of the virtual disk than a second data block of the virtual disk; copying the data of the first data block into a location of the virtual disk that stores the data of the second data block; updating an entry in a first data structure so that the entry, which was previously mapped to the first data block is now mapped to the second data block; updating an entry in a second data structure that maintains usage indicators for data blocks in the virtual disk so that a usage indicator for the second data block is changed from unused to used and a usage indicator for the first data block is changed from used to unused. In one embodiment, the steps of this method are carried out repetitively until all the data blocks in the virtual disk that are indicated by the second data structure as being unused are collocated at the end of the virtual disk, and then a file descriptor for the virtual disk that is maintained by the virtual machine file system is updated to remove references to one or more virtual machine file system blocks corresponding to a group of unused data blocks collocated at the end of the virtual disk.

DETAILED DESCRIPTION

Figure 1:
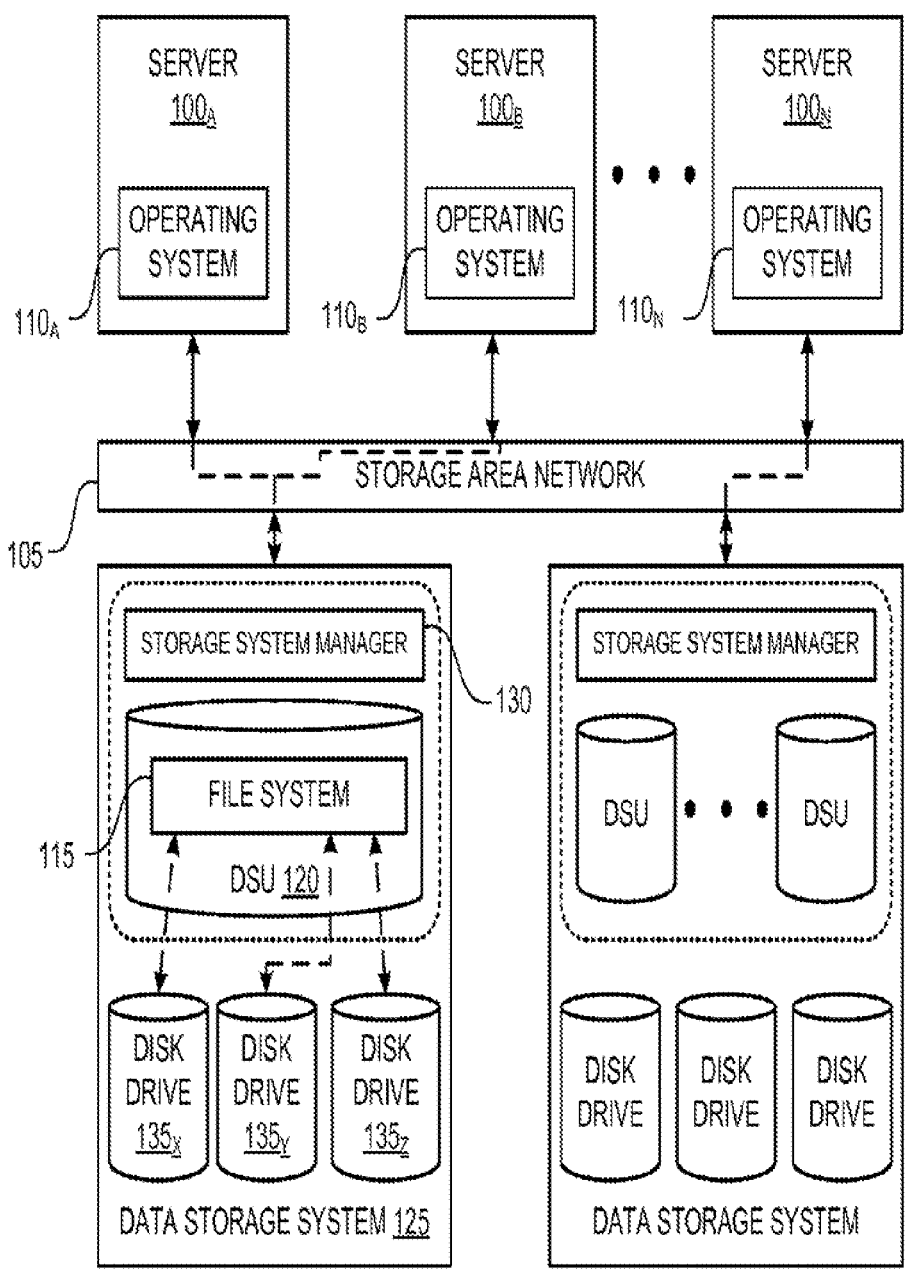
FIG. 1 illustrates a computer system configuration utilizing a shared file system, according to an embodiment.

FIG. 1 illustrates a computer system configuration utilizing a shared file system, according to one embodiment. The computer system configuration of FIG. 1 includes multiple servers $100_A$ to $100_N$ each of which is connected to storage area network (SAN) 105. Operating systems $110_A$ and $110_B$ on servers $100_A$ and $100_B$ interact with a shared file system 115 that resides on a data storage unit (DSU) 120 accessible through SAN 105. In particular, data storage unit 120 is a logical unit (LUN) of a data storage system 125 (e.g., disk array) connected to SAN 105. While DSU 120 is exposed to operating systems $110_A$ to $110_B$ by system storage manager 130 (e.g., disk controller) as a contiguous logical storage space, the actual physical data blocks upon which shared file system 115 may be stored is dispersed across the various physical disk drives $135_X$ to $135_Z$ of data storage system 125.

Data in DSU 120 (and possibly other DSUs exposed by the data storage systems) are accessed and stored in accordance with structures and conventions imposed by shared file system 115 which, for example, stores such data as a plurality of files of various types, typically organized into one or more directories. Shared file system 115 further includes metadata data structures that store or otherwise specify information, for example, about how data is stored within shared file system 115, such as block bitmaps that indicate which data blocks in shared file system 115 remain available for use, along with other metadata data structures indicating the directories and files in shared file system 115, along with their location. For example, sometimes referred to as a file descriptor or inode, each file and directory may have its own metadata data structure associated therewith, specifying various information, such as the data blocks that constitute the file or directory, the date of creation of the file or directory, etc.

Figure 2:
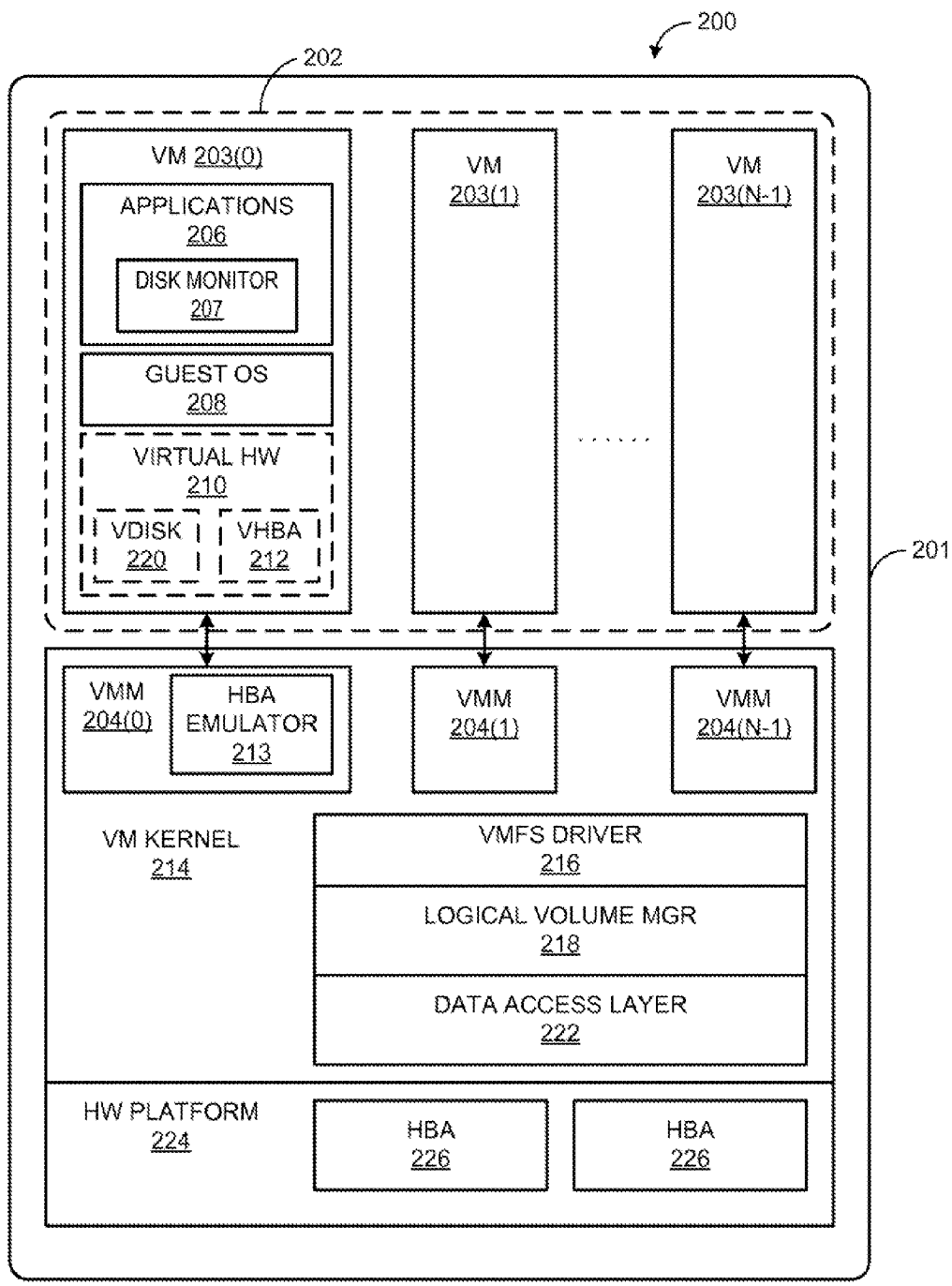
FIG. 2 illustrates a virtual machine based computer system, according to an embodiment.

FIG. 2 illustrates a virtual machine based computer system 200, according to an embodiment. A computer system 201, generally corresponding to one of the servers 100, is constructed on a conventional, typically server-class hardware platform 224, including, for example, host bus adapters (HBAs) 226 that network computer system 201 to remote data storage systems, in addition to conventional platform processor, memory, and other standard peripheral components (not separately shown). Hardware platform 224 is used to execute a hypervisor 214 (also referred to as virtualization software) supporting a virtual machine execution space 202 within which virtual machines (VMs) 203 can be instantiated and executed. For example, in one embodiment, hypervisor 214 may correspond to the vSphere product (and related utilities) developed and distributed by VMware, Inc., Palo Alto, Calif. although it should be recognized that vSphere is not required in the practice of the teachings herein.

Hypervisor 214 provides the services and support that enable concurrent execution of virtual machines 203. Each virtual machine 203 supports the execution of a guest operating system 208, which, in turn, supports the execution of applications 206. Examples of guest operating system 208 include Microsoft® Windows®, the Linux® operating system, and NetWare®-based operating systems, although it should be recognized that any other operating system may be used in embodiments. Guest operating system 208 includes a native or guest file system, such as, for example, an NTFS or ext3FS type file system. The guest file system may utilize a host bus adapter driver (not shown) in guest operating system 208 to interact with a host bus adapter emulator 213 in a virtual machine monitor (VMM) component 204 of hypervisor 214. Conceptually, this interaction provides guest operating system 208 (and the guest file system) with the perception that it is interacting with actual hardware.

FIG. 2 also depicts a virtual hardware platform 210 as a conceptual layer in virtual machine 203(0) that includes virtual devices, such as virtual host bus adapter (HBA) 212 and virtual disk 220, which itself may be accessed by guest operating system 208 through virtual HBA 212. In one embodiment, the perception of a virtual machine that includes such virtual devices is effectuated through the interaction of device driver components in guest operating system 208 with device emulation components (such as host bus adapter emulator 213) in VMM 204(0) (and other components in hypervisor 214).

File system calls initiated by guest operating system 208 to perform file system-related data transfer and control operations are processed and passed to virtual machine monitor (VMM) components 204 and other components of hypervisor 214 that implement the virtual system support necessary to coordinate operation with hardware platform 224. For example, HBA emulator 213 functionally enables data transfer and control operations to be ultimately passed to the host bus adapters 226. File system calls for performing data transfer and control operations generated, for example, by one of applications 206 are translated and passed to a virtual machine file system (VMFS) driver 216 that manages access to files (e.g., virtual disks, etc.) stored in data storage systems (such as data storage system 125) that may be accessed by any of the virtual machines 203. In one embodiment, access to DSU 120 is managed by VMFS driver 216 and shared file system 115 for LUN 120 is a virtual machine file system (VMFS) that imposes an organization of the files and directories stored in DSU 120, in a manner understood by VMFS driver 216. For example, guest operating system 208 receives file system calls and performs corresponding command and data transfer operations against virtual disks, such as virtual SCSI devices accessible through HBA emulator 213, that are visible to guest operating system 208. Each such virtual disk may be maintained as a file or set of files stored on VMFS, for example, in DSU 120. The file or set of files may be generally referred to herein as a virtual disk and, in one embodiment, complies with virtual machine disk format specifications promulgated by VMware (e.g., sometimes referred to as a vmdk files). File system calls received by guest operating system 208 are translated to instructions applicable to particular file in a virtual disk visible to guest operating system 208 (e.g., data block-level instructions for 4 KB data blocks of the virtual disk, etc.) to instructions applicable to a corresponding vmdk file in VMFS (e.g., virtual machine file system data block-level instructions for 1 MB data blocks of the virtual disk) and ultimately to instructions applicable to a DSU exposed by data storage unit 125 that stores the VMFS (e.g., SCSI data sector-level commands). Such translations are performed through a number of component layers of an "IO stack," beginning at guest operating system 208 (which receives the file system calls from applications 206), through host bus emulator 213, VMFS driver 216, a logical volume manager 218 which assists VMFS driver 216 with mapping files stored in VMFS with the DSUs exposed by data storage systems networked through SAN 105, a data access layer 222, including device drivers, and host bus adapters 226 (which, e.g., issues SCSI commands to data storage system 125 to access LUN 120).

In one embodiment, guest operating system 208 further supports the execution of a disk monitor application 207 that monitors the use of data blocks of the guest file system (e.g., by tracking relevant bitmaps and other metadata data structures used by guest file system, etc.) and issues unmap commands (through guest operating system 208) to free data blocks in the virtual disk. The unmap commands may be issued by disk monitor application 207 according to one of several techniques. According to one technique, disk monitor application 207 creates a set of temporary files and causes guest operating system 208 to allocate data blocks for all of these files. Then, disk monitor application 207 calls into the guest operating system 208 to get the locations of the allocated data blocks, issues unmap commands on these locations, and then deletes the temporary files. According to another technique, the file system driver within the guest operating system 208 is modified to issues unmap commands as part of a file system delete operation. Other techniques may be employed if the file system data structures and contents of the data blocks are known. For example, in embodiments where virtual disk 220 is a SCSI-compliant device, disk monitor application 207 may interact with guest operating system 208 to request issuance of SCSI UNMAP commands to virtual disk 220 (e.g., via virtual HBA 212) in order to free certain data blocks that are no longer used by guest file system (e.g., blocks relating to deleted files, etc.). References to data blocks in instructions issued or transmitted by guest operating system 208 to virtual disk 220 are sometimes referred to herein as "logical" data blocks since virtual disk 220 is itself a logical conception (as opposed to physical) that is implemented as a file stored in a remote storage system. It should be recognized that there are various methods to enable disk monitor application 207 to monitor and free logical data blocks of guest file system. For example, in one embodiment, disk monitor application 207 may periodically scan and track relevant bitmaps and other metadata data structures used by guest file system to determine which logical data blocks have been freed and accordingly transmit unmap commands based upon such scanning. In an alternative embodiment, disk monitor application 207 may detect and intercept (e.g., via a file system filter driver or other similar methods) disk operations transmitted by applications 206 or guest operating system 208 to an HBA driver in guest operating system 208 and assess whether such disk operations should trigger disk monitor application 207 to transmit corresponding unmap commands to virtual disk 220 (e.g., file deletion operations, etc.) It should further be recognized that the functionality of disk monitor application 207 may be implemented in alternative embodiments in other levels of the IO stack. For example, while FIG. 2 depicts disk monitor application 207 as a user-level application (e.g., running in the background), alternative embodiments may implement such functionality within the guest operating system 208 (e.g., such as a device driver level component, etc.) or within the various layers of the IO stack of hypervisor 214.

It should be recognized that the various terms, layers and categorizations used to describe the virtualization components in FIG. 2 may be referred to differently without departing from their functionality or the spirit or scope of the invention. For example, virtual machine monitors (VMM) 204 may be considered separate virtualization components between VMs 203 and hypervisor 214 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 210 may be merged with and into VMM 204 such that virtual host bus adapter 212 is removed from FIG. 2 (i.e., since its functionality is effectuated by host bus adapter emulator 213).

Figure 3A:
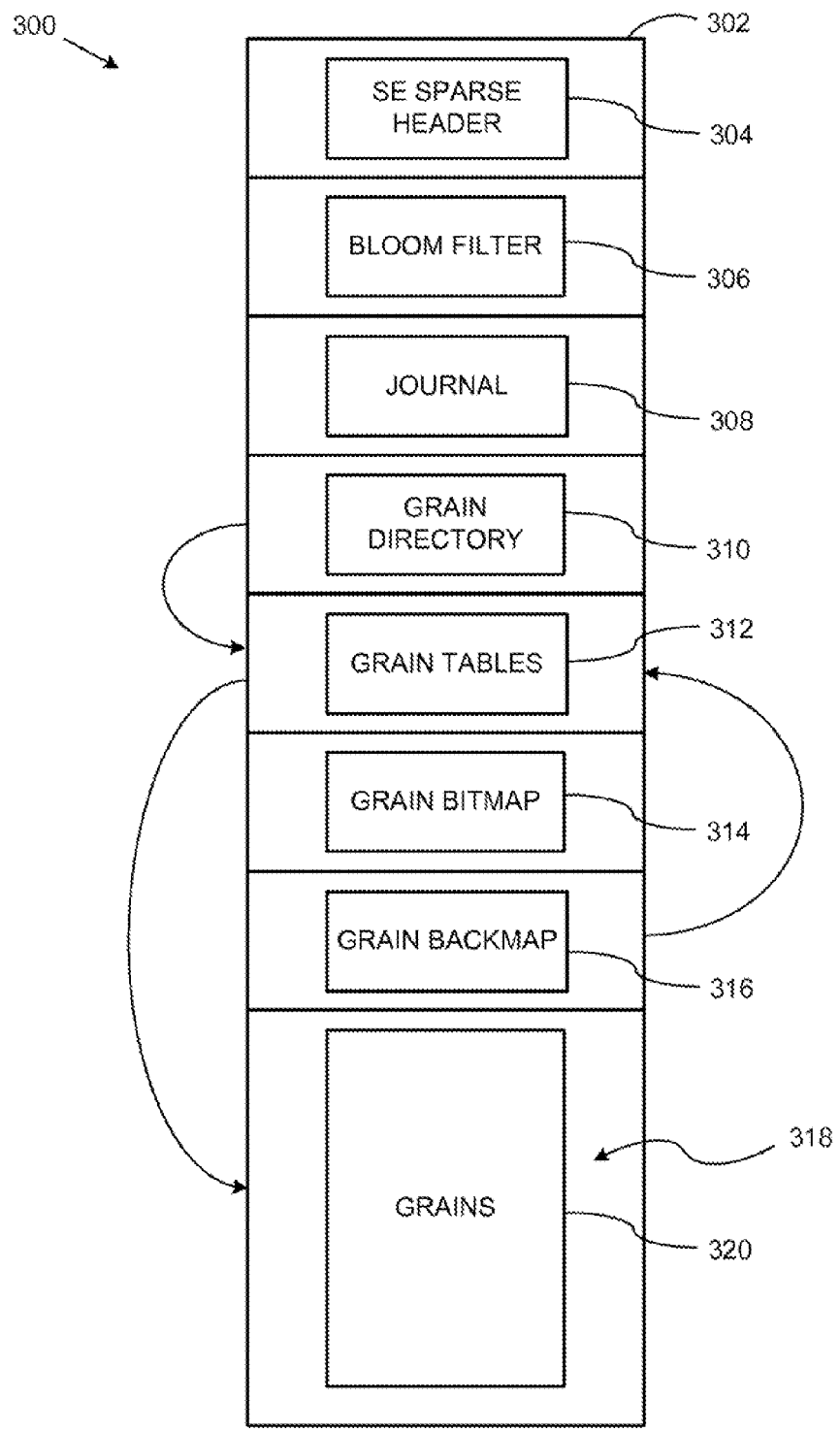
FIG. 3A is a diagram that graphically illustrates a virtual disk format of an exemplary virtual disk, according to an embodiment.

FIG. 3A is a diagram that graphically illustrates a virtual disk format of an exemplary virtual disk, according to an embodiment of the present invention. Virtual disk 220 may be implemented as a space-efficient virtual disk 300 that is thinly provisioned by hypervisor 214. A region of physical storage used by virtual disk 300 that grows over time is referred to herein as a "sparse extent" 302. Although, for exemplary purposes, the various figures and discussions herein depict virtual disk 300 as a single file having a single sparse extent 302, it should be recognized that alternative embodiments may utilize additional files and sparse extents. For example, in one alternative embodiment, virtual disk 300 may comprise a chain of linked files, wherein the first file is referred to as a base disk containing an initial state of virtual disk 300 and each subsequent linked file is referred to as a "delta disk," "delta-link" or "redo log" which each contain changes to virtual disk 300 occurring over time. Each of the base disk and delta disks, in turn, may comprise one or more sparse extents that grow over time (with each such sparse extent also comprising a file itself).

In the embodiment of FIG. 3A, sparse extent 302 of virtual disk 300 includes a plurality of metadata structures that hypervisor 214 uses to manage virtual disk 300. Sparse extent 302 includes a space-efficient sparse header 304, a bloom filter 306, and a journal 308. Sparse header 304 includes information describing configuration and settings of sparse extent 302, such as, for example, the size of a grain (e.g., 4

KBs) which, in one embodiment, may be expressed in sparse header 304 as a multiple (e.g., 8) of the size of a sector (e.g., 512 bytes). Such a grain size may be configured by hypervisor 214 during creation of virtual disk 300 to match the logical data block sizes utilized by the guest file system of the guest operating system 208. Bloom filter 306 is a space-efficient data structure accessed by hypervisor 214, for example, when virtual disk 300 includes additional linked delta disk files. Upon receiving a file read operation, hypervisor 214 may access bloom filter 306 to more efficiently assess whether the file read operation relates to data stored in the base disk (or other "higher-level" delta disks), thereby reducing I/O lookup costs of traversing multiple delta disks to make such determination (although it should be recognized that other space-efficient data structures may be utilized in alternative embodiments). Journal 308 provides a journalled metadata infrastructure for virtual disk 300 in order to store completed "transactions" (e.g., writes to disk, etc.) prior to committing them in order to maintain and recover consistent metadata and data states in shared file system 115 in the event of host or storage system crashes. It should be recognized that various structures in sparse extent 302 such as bloom filter 306 and journal 308 are merely exemplary and that alternative embodiments may not necessarily include such structures. As further discussed below, sparse extent 302 also includes a grain directory 310, one or more grain tables 312, a grain bitmap 314, a grain backmap 316, and a space 318 reserved for storing one or more grains 320.

Figure 3B:
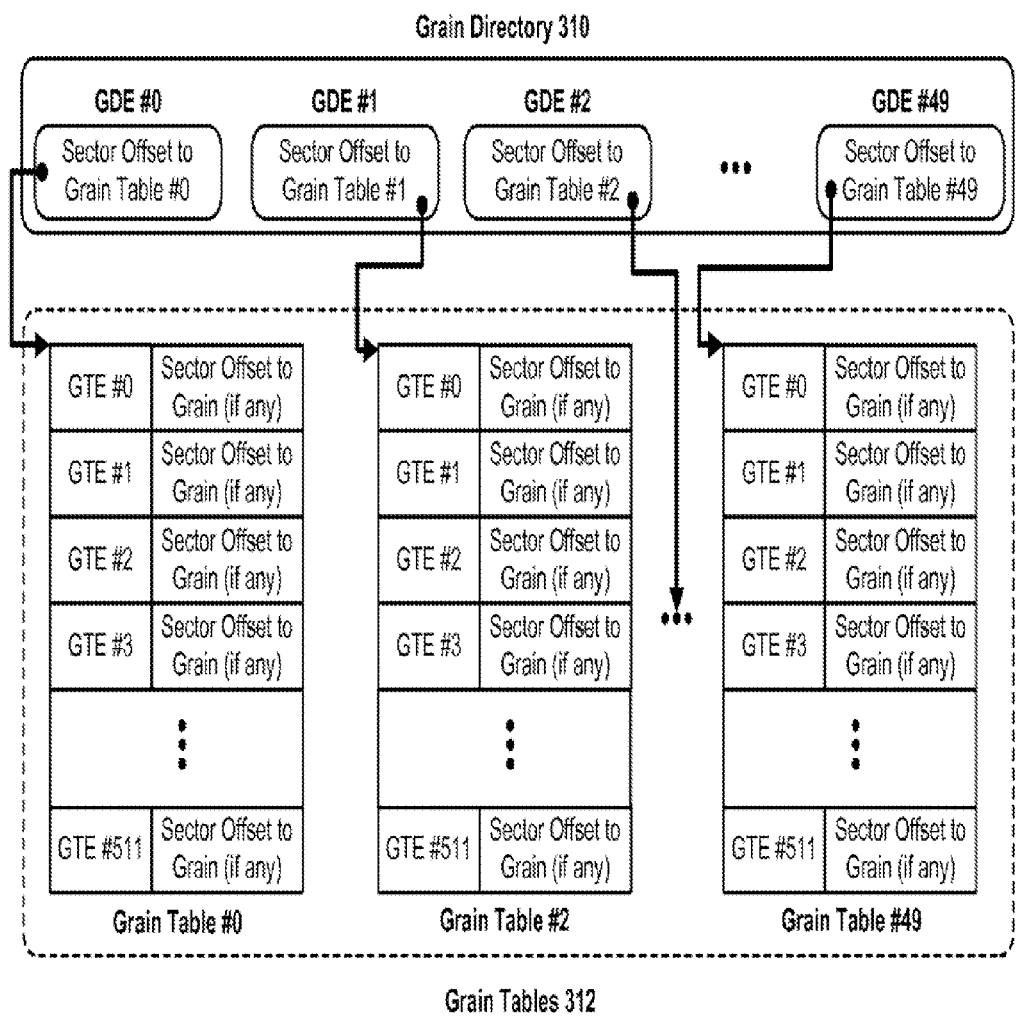
FIG. 3B is a diagram that graphically illustrates a grain directory and grain tables, according to an embodiment.

FIG. 3B is a diagram that graphically illustrates a grain directory and grain tables, according to an embodiment. When a request to access a particular logical data block of virtual disk 300 is made, hypervisor 214 is able to access grain directory 310 and grain tables 312 to determine which grain (if any) in space 318 corresponds to such a logical data block. Grain directory 310 subdivides the logical data blocks available in virtual disk 300 (e.g., in sparse extent 302) such that each grain directory entry (GDE) represents a contiguous portion of logical data blocks of virtual disk 300. In particular, each GDE itself comprises a reference (e.g., an offset in sectors in the virtual disk) to one of grain tables 312. Each entry in a grain table, referred to as a grain table entry (GTE), also comprises a reference (e.g., an offset in sectors in the virtual disk) to a grain allocated in space 318. In the embodiment of FIG. 3B, for example, each grain table 312 comprises 512 GTEs and each GTE references a grain of 4 KBs (i.e., 1 logical data block in the guest file system) such that each GDE provides access to a 2 MB portion of contiguous logical data blocks available in virtual disk 300 (i.e., number of entries (512)*grain size (4 KB)=2 MBs). If, in such an embodiment, sparse extent 302 was initially created to provide virtual disk 300 with 100 MBs of storage space, then grain directory 310 is initialized to include 50 GDEs (i.e., 100 MBs/2 MBs). In such an embodiment, hypervisor 214 can traverse grain directory 310 and grain tables 312 to determine a grain in sparse extent 302 that corresponds to, for example, logical data block 50 in the 100 MBs of virtual disk 300. Specifically, hypervisor 214 determines that the first GDE of grain directory 310, namely, GDE 0, references the appropriate grain table by calculating the following: $50^{th}$ logical data block of 100 MBs of data/512 logical data blocks accessible per GDE=$0^{th}$ GDE. Hypervisor 214 then accesses the grain table referenced in GDE 0 and determines that the $50^{th}$ GTE of the referenced grain table should contain a reference to a grain in space 318 that corresponds to the $50^{th}$ logical data block of virtual disk 300 (i.e., by calculating the following: $50^{th}$ logical data block of 100 MBs of data % 512 contiguous logical data blocks accessible in GDE 0)=$50^{th}$ GTE). Furthermore, if the value of the $50^{th}$ GTE is 0 (or any other similar unique identifier), then a grain has not yet been allocated for the $50^{th}$ logical data block of the 100 MBs of available data in sparse extent 302 for virtual disk 300 (e.g., and hypervisor 512 can allocate a grain in space 318 at that time, if needed, such as for a write operation to the $50^{th}$ logical data block). As such, it should be recognized that when sparse extent 302 is initially created in such an embodiment, all grain tables are initialized to 0 (or any other similar unique identifier) meaning that a grain has not yet been allocated to any logical data blocks of virtual disk 300 and once a grain is allocated from space 318, the corresponding grain table entry is set with an offset of sectors to the grain in sparse extent 302. It should further be recognized that alternative embodiments may not necessarily utilize a grain directory to provide an initial subdivision of the storage space available in sparse extent 302 but rather rely solely on grain tables (which may have entries of arbitrary size, versus a fixed length of 512 entries as discussed herein).

In some embodiments, some GDEs may have SPARSE/NULL entries and may not hold a valid grain table pointer. In addition, it should be recognized that the GDEs of grain directory 310 may not necessarily point to grain tables having monotonically increasing grain table numbers.

As discussed above, because virtual disk 300 is created with "sparse" extent 302, it is thinly provisioned such that grains are not initially allocated to the virtual disk (e.g., vmdk file) during initial creation but are allocated only when additional storage space is needed by the virtual disk. In one embodiment, grain tables 312 may be further configured to reduce or eliminate storage of "zero blocks" (e.g., data blocks having no data) in the virtual disk 300. Guest operating system 208 may request a zero block, for example, by requesting that a logical data block be zeroed out (i.e., zeroes written into the data block) for security purposes, prior to re-allocating the data block to a file in virtual disk 300. In such an embodiment, instead of allocating a grain that will store only zeroes for the logical data block, hypervisor 214 may alternatively store, within the GTE corresponding to the logical data block, a specific value or identifier representing the zero block (referred to as a "sentinel" value). When guest operating system 208 requests a read operation on the logical data block, hypervisor 214 looks up the GTE corresponding to the logical data block, recognizes the sentinel value stored in the GTE and accordingly, returns zero block data to guest operating system 208. As such, less disk storage is used by not having to actually store the zero blocks. The sentinel value may be a pre-determined unique value stored in a grain table entry 404 and reserved for use by the hypervisor 214, although it should be recognized that the sentinel value may be implemented in a variety of alternative ways. It should further be recognized that the foregoing sentinel value technique for reducing storage for zero blocks may be extended to any common data pattern that may repetitively occur. In one embodiment, hypervisor 214 may be configured to recognize any pre-determined data block pattern and set sentinel values in GTEs accordingly. For example, hypervisor 214 may be configured to include a pattern library having a plurality of pre-determined patterns that are mapped to with corresponding sentinel values. In such an embodiment, when hypervisor 214 detects a pre-determined pattern in a virtual disk operation, hypervisor 214 may reference the pattern library and store the determined sentinel value in a GTE rather than allocate a new grain for the virtual disk operation. Likewise, for a read operation to a block whose GTE points to a sentinel value, hypervisor 214 copies the pre-determined pattern corresponding to the sentinel value to the memory location associated with the read operation.

Furthermore, grain tables 312 themselves may also be allocated in a space efficient manner during creation of virtual disk 300. In one implementation, upon creation of virtual disk 300, hypervisor 214 may logically pre-allocate space for grain tables 312 within the sparse extent 302. As such, grain tables 312 will be located at predefined logical file offsets within the sparse extent 302. This approach reduces a false-sharing effect that may occur between the grain tables 312 and grains 320. According to another implementation, the hypervisor 214 may allocate space for the grain tables 312 such that the footprint size of a cluster of grain tables 312 is a multiple of the underlying lower level storage system's block size. This approach decreases the amount of unused space that may otherwise be allocated for a cluster of grain tables in case where the cluster straddles across the underlying file system's file block boundaries. According to yet another implementation, the hypervisor 214 may use a lazy-zero method to allocate regions of space for the grain tables 312. Allocating grain tables 312 may generally result in a thin-provisioned expansion of the sparse extent 302. Rather than relying on a delta disk driver to zero out to-be-used metadata regions within the sparse extent 302, the hypervisor 214 may instead rely on a lazy zeroing process, as employed in VMFS, to perform zeroing of the metadata regions.

Figure 3C:
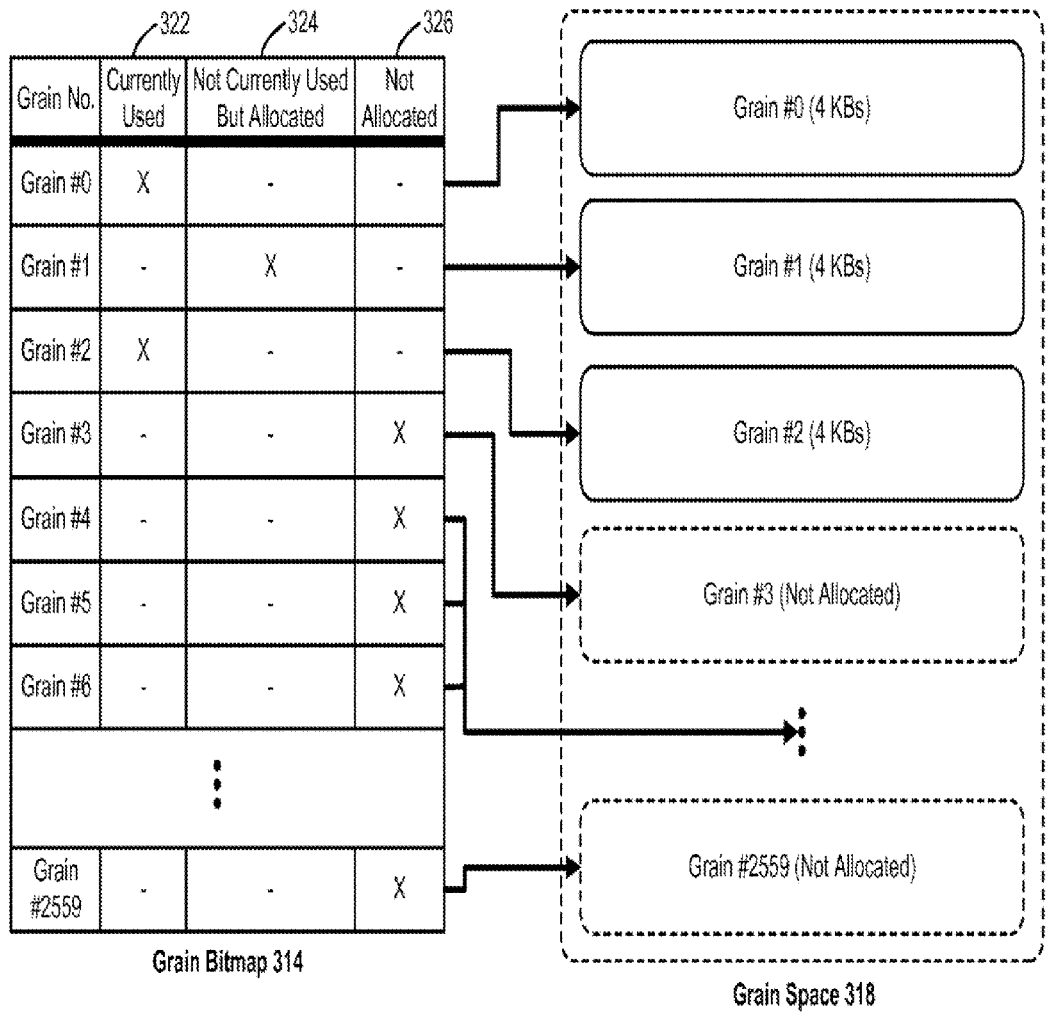
FIG. 3C is a diagram that graphically illustrates a grain bitmap, according to an embodiment.

FIG. 3C is a diagram that graphically illustrates a grain bitmap, according to an embodiment. Grain bitmap 314 tracks usage of grains in sparse extent 302 and enables hypervisor 214 to selectively choose particular grains when hypervisor 214 needs to allocate a grain for a logical data block of virtual disk 300 (as further discussed below). In the embodiment of FIG. 3C, grain bitmap 314 includes a plurality of bitmap entries, wherein each bitmap entry corresponds to a grain that is available in sparse extent 302, regardless of whether physical storage space has actually been allocated by the remote storage system for such a grain. In the embodiment of FIG. 3C, each bitmap entry provides an identification of an available grain in space 318 and an indication (see indicators 322, 324 and 326) as to whether the corresponding grain: (i) is currently being used to store data, (ii) is currently unused but has been previously allocated (e.g., was used to store data at some point but is no longer in used), or (iii) has not been allocated (e.g., has not been used by the virtual disk or has been de-allocated as further discussed below). As depicted in FIG. 3C, for example, grain bitmap 314 has 2560 entries, reflecting that sparse extent 302 was initially created to provide virtual disk 300 with 10 MBs of data (e.g., since each grain comprises 4 KBs of data), although 10 MBs are not immediately allocated to virtual disk 300 due to thin provisioning. Grain bitmap 314 illustrates that only three grains of the virtual disk, grain #0, grain #1 and grain #2, are currently allocated, indicating that the size of the data portion (i.e., space 318) of the virtual disk for virtual disk 300 is 12 KBs. Although grain bitmap 314 includes entries for the remaining grains (i.e., grains #4-#2259), such entries do not actually have a corresponding grain in space 318 of the virtual disk. Furthermore, grain bitmap 314 indicates that grain #1 is no longer being used. The status of a grain such as grain #1 can change from currently used (e.g., indicator 322) to unused (e.g., indicator 324), for example, if a file in the guest file system having a logical data block that corresponds to data in grain #1 is deleted and disk monitor application 207 correspondingly transmits an unmap command to guest operating system 208 to unmap the logical data block, as further discussed herein in the context of FIG. 5. Similarly, as further discussed in the context of FIG. 4A, hypervisor 214 may traverse grain bitmap 314 to select a more "desirable" grain to store data, for example, upon receiving a write operation to a logical data block from guest operating system 208. As further discussed in the context of FIG. 6, hypervisor 214 may also traverse grain bitmap 314 to "collocate" unused grains to the end of the virtual disk in an effort to defragment and truncate the virtual disk, for example, by releasing certain sectors back to the remote storage system that correspond to unused collocated grains after such defragmentation (e.g., via sector-level unmap commands to the remote storage system). In addition, the status of a grain may change from currently used (e.g., indicator 322) to not allocated (e.g., indicator 326), if an application inside VM 203 overwrites an entire logical data block with zeroes.

It should be recognized that grain bitmap 314 may be utilized by hypervisor 214 for other reasons as well. For example, hypervisor 214 may traverse grain bitmap 314 to monitor and report the amount of space-savings within virtual disk 300 without having to perform an exhaustive scan (i.e., introspection) of the virtual disk contents, relying instead on information in grain bitmap 314 about the amount of grains being used and/or allocated by guest operating system 208 compared to the total number of grains available in the virtual disk 300 upon its creation. In addition, grain bitmap 314 may be consulted to reduce network bandwidth and other costs when migrating space-efficient virtual disk 300 from one host to another host, because data blocks that are not allocated do not need to be copied.

It should be recognized that although grain bitmap 314 has been referred to as a "bitmap," such a term should be construed broadly to mean any data structure that can maintain the information depicted in FIG. 3C regarding each grain in space 318. Furthermore, alternative embodiments may utilize grain bitmaps that track less or more information relating to grains in space 318 depending upon the levels of space efficiency desired in such embodiments. In one such alternative embodiment, each bitmap entry of grain bitmap 314 provides an identification of an available grain in space 318 and an indication as to whether the corresponding grain: (i) is currently being used to store data, or (ii) is not used (regardless of whether it has been allocated or not). The information as to whether a grain is currently unused but previously allocated may be derived by checking if the grain has a sector offset that is less than the current file length.

Figure 3D:
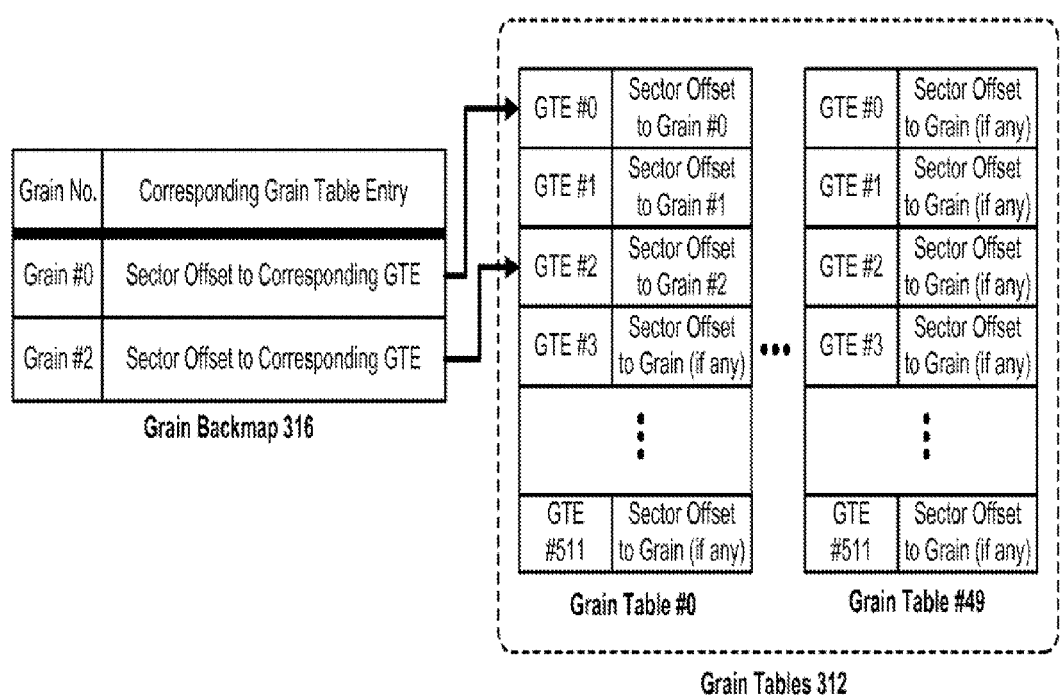
FIG. 3D is a diagram that graphically illustrates a grain backmap, according to an embodiment.

FIG. 3D is a diagram that graphically illustrates a grain backmap, according to an embodiment. Grain backmap 316 enables hypervisor 214 to identify a GTE corresponding to a grain in space 318. As further discussed in the context of FIG. 6, grain backmap 316 assists hypervisor 214 in defragmenting virtual disk 300 by collocating unused grains towards the end of the virtual disk so that a truncation (e.g., unmap commands issued by hypervisor 214 to the remote storage system) of the virtual disk may reclaim storage space. As depicted in the embodiment of FIG. 3D, grain backmap 316 comprises a plurality of backmap entries corresponding to each grain in space 318 that is currently in use (e.g., indicator 322 in grain bitmap 314) by the guest file system (e.g., grains in space 318 that are allocated but unused do not have a backmap entry in the embodiment of FIG. 3D, although alternative embodiments may maintain an entry for such unused grains as well). In one embodiment, grain backmap 316 provides a backmap entry for every grain that is possible, and is thin-provisioned so that only the grains that are allocated have a valid backmap entries and all other backmap entries are invalid. Each backmap entry comprises an identification of the grain (e.g., grain number, sector offset of grain in virtual disk 300, etc.) and a corresponding identification (e.g., sector offset, etc.) of a GTE in grain tables 312 that includes a reference (e.g., sector offset, etc.) back to the grain. FIG. 3D depicts a simple version of a grain backmap 316, consistent with grain bitmap 314 in FIG. 3C. As depicted, grain #0 and grain #2 have entries in grain backmap 316 consistent with the indicators in grain bitmap 314 that such grains are currently in use by the guest file system. Grain #1, however, does not have an entry in grain backmap 316, consistent with the indicator in grain bitmap 314 that it is not currently in use by the guest file system. Although grain backmap 316 is depicted as a lookup table in FIG. 3D, it should be recognized that any suitable data structure may be utilized to provide a one-to-one mapping between a grain that is in use and a GTE pointing to that grain. It should be further recognized that alternative embodiments may implement grain bitmap 314 and grain backmap 316 as a combined data structure.

Figure 4A:
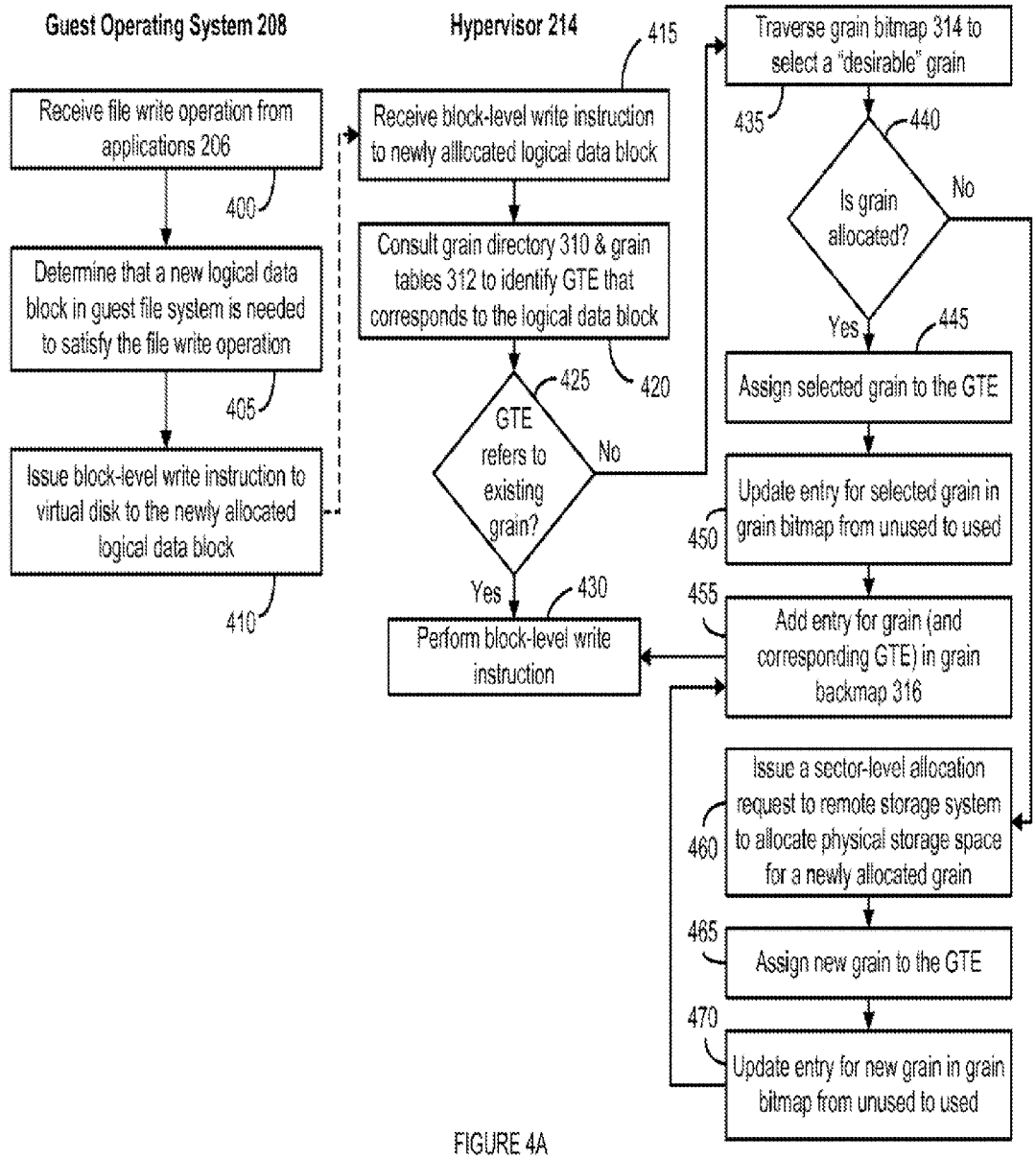
FIG. 4A illustrates a method for performing a write operation according to an embodiment, according to an embodiment.

FIG. 4A illustrates a method for performing a write operation according to an embodiment. In particular, the various grain data structures described herein (grain tables, grain bitmap, grain backmap, etc.) are atomically updated during typical write operations that are performed by virtual machine 208 during the course of execution.

In step 400, guest operating system 208 receives a write operation from one of applications 206. For example, such an application may request that data be written to a file residing on virtual disk 300. Upon receipt of the write operation, guest operating system 208 may access metadata data structures of the guest file system to determine whether a new data block needs to be allocated for the write operation. For example, guest operating system 208 may first access a file descriptor (e.g., inode, etc.) stored in guest file system for the file relating to the write operation and, based upon data block information therein, conclude, in step 405, that the file requires allocation of a new logical data block in the guest file system. Guest operating system 208 may then consult a data block bitmap (or other similar data structure) maintained by guest file operating system, select a free data block based on the bitmap (e.g., marking the bit entry in bitmap) and update the file descriptor for the file accordingly to indicate that the selected data block has been allocated to the file. In step 410, guest operating system 208 then issues to virtual disk 300 a block-level write instruction directed towards the newly allocated logical data block.

In step 415, hypervisor 214 (via HBA emulator 213, for example) receives the block-level write instruction and, in step 420, consults grain directory 310 and grain tables 312 to identify the GTE that corresponds to the logical data block. It should be recognized that in order to access grain directory 310 and grain tables 312 stored in the virtual disk in step 420, in one embodiment, hypervisor 214 first accesses a file descriptor (e.g., inode, etc.) maintained by the virtual machine file system (e.g., VMFS) for the file representing the virtual disk, thereby obtaining access to references of virtual machine file system data blocks (e.g., of 1 MB block size) in the virtual machine file system that store the contents of the virtual disk (i.e., including the virtual machine file system data blocks storing grain directory 310 and grain tables 312). If, in step 425, the GTE includes a reference (e.g., sector offset) to an existing grain, in step 430, hypervisor 214 performs the requested block-level write instruction into the grain (e.g., by translating the sector offset to the grain to an offset into a corresponding virtual machine file system data block and ultimately into a corresponding sector-level write instruction through the stack of hypervisor 214 and issuing the corresponding sector-level write instruction to the remote storage system).

If, in step 425, the GTE indicates that no grain is currently allocated for the logical data block, in step 435, hypervisor 214 traverses grain bitmap 314 to select a "desirable" grain. In one embodiment, a desirable grain is a grain that is located proximate to other grains that are currently in use by guest operating system 208 such that the spatial locality of currently used grains in space 318 is maintained or otherwise improved. For example, in the embodiments reflected in FIGS. 3C and 3D, grain #1 is a desirable grain because it is located proximate to grain #0 and grain #2, both which are currently in use. In another embodiment, the "desirable" grain is selected so that the spatial locality of the block address space of the virtual disk is maintained or otherwise improved. If it is determined in step 440 that the selected grain is allocated (i.e., the grain maps to a file offset that is less than the current file length), then steps 445, 450 and 455 are carried out in an atomic manner. In step 445, hypervisor 214 assigns the grain to the GTE, and, in step 450, updates the entry for the grain in grain bitmap 314 from currently unused to currently used. In step 455, hypervisor 214 also adds an entry for the grain (and corresponding GTE) in grain backmap 316 before returning to step 430 to perform the block-level write instruction into the grain. If, however, in step 440, the selected grain is not allocated, then steps 460, 465, 470, and 455 are carried out in an atomic manner. In step 460, hypervisor 214 allocates additional space from the virtual machine file system to accommodate a new grain in the virtual disk. For example, hypervisor 214 may access a virtual machine file system free data block bitmap data structure maintained by the virtual machine file system to select a free virtual machine file system data block (e.g., of 1 MB size) to allocate to the virtual disk and accordingly update the file descriptor of the virtual disk to include a reference to the newly allocated virtual machine file system data block (e.g., extending the current size of the virtual disk by 1 MB). If a virtual machine file system data block of 1 MB is allocated to the virtual disk, then a total of 256 (1 MB/4 KB) new grains, including the desirable grain of step 435, are available in the virtual disk. Once the new grains have been allocated, in step 465, hypervisor 214 assigns the desirable grain to the GTE, and, in step 470, updates the entry for the grain in grain bitmap 314 from unused to used. Hypervisor 214 then returns to step 455, and adds an entry for the grain (and corresponding GTE) in grain backmap 316 before returning to step 430 to perform the block-level write instruction into the newly allocated grain.

It should be recognized that in certain instances, guest operating system 208 may transmit a block-level write instruction to hypervisor 214 to write one or more zero blocks to a virtual disk 300 (e.g., to zero out blocks for security reasons prior to allocating them to a different file in the guest file system). In such instances, for certain embodiments, hypervisor 214 may then modify the GTE identified in step 420 to contain a sentinel value denoting a zero block. In one such embodiment, any pre-existing allocated grain mapped to such GTE is marked as currently unused in grain bitmap 314 and any corresponding entry for the grain in grain backmap 316 is removed. It should be further recognized that the flow of the method depicted in FIG. 4 is merely exemplary and alternatives may modify such the flow of the method without departing from the spirit of teachings herein.

Figure 4B:
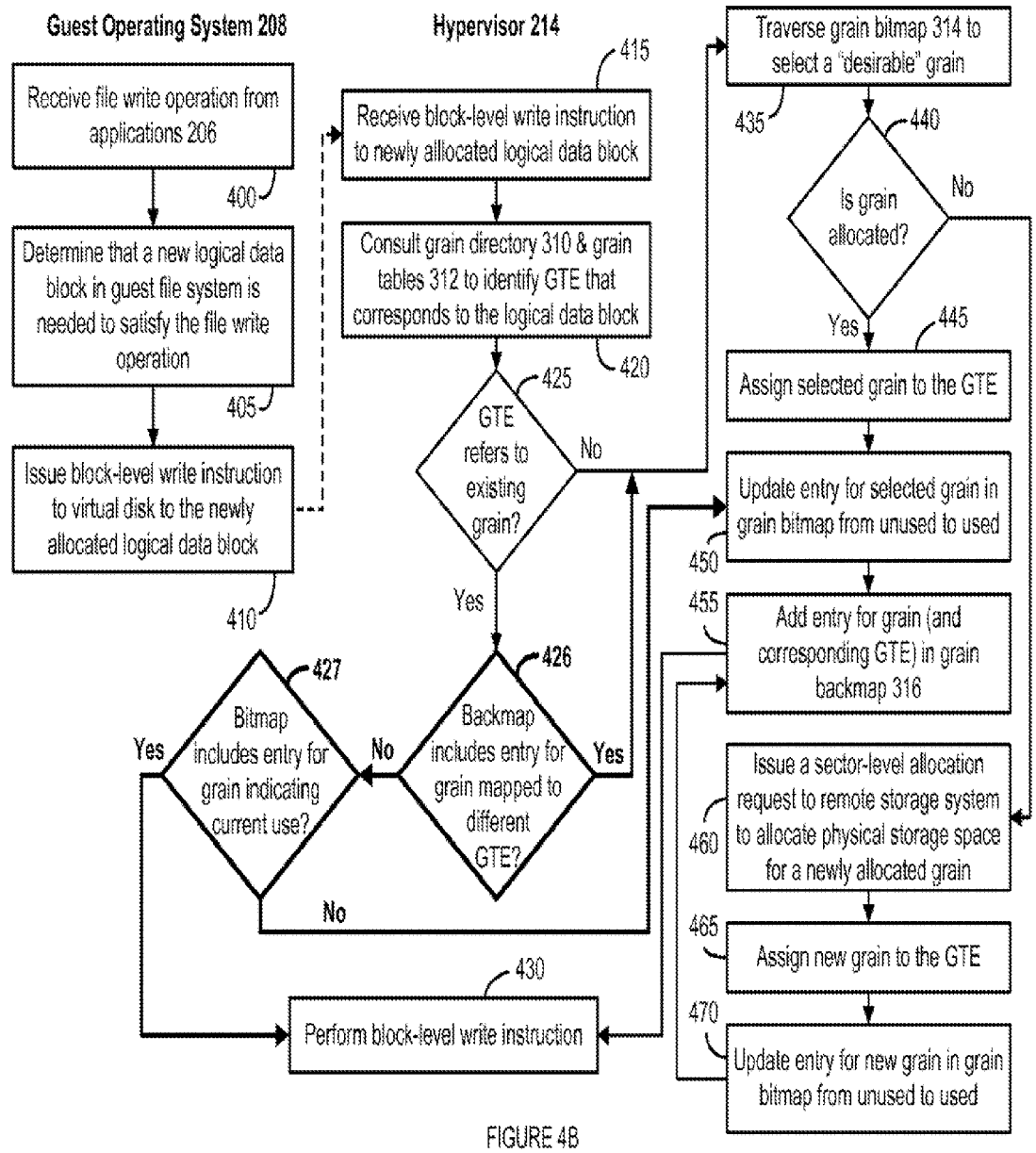
FIG. 4B illustrates an alternative method for performing a write operation according to an embodiment, according to an alternative embodiment.
Figure 4C:
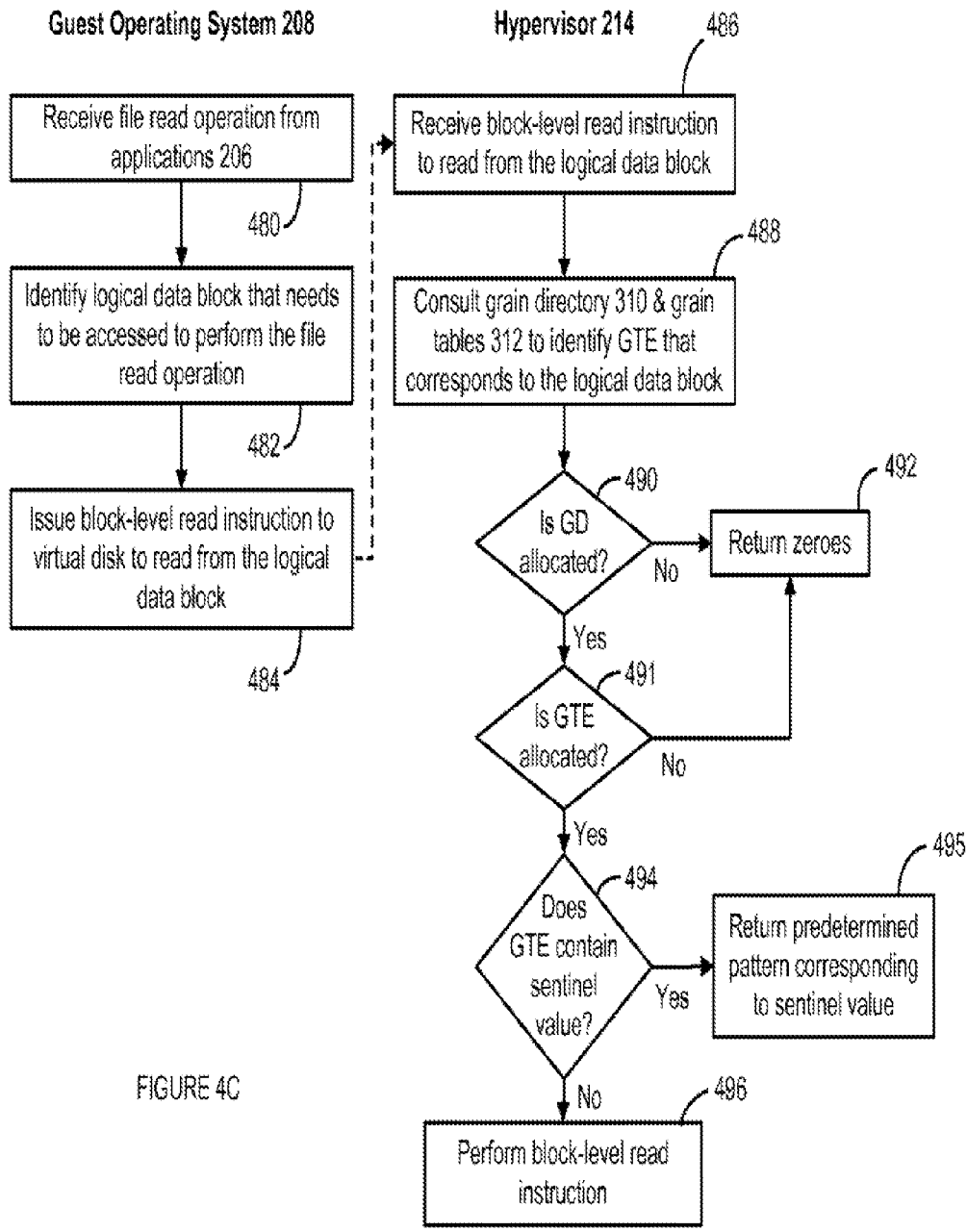
FIG. 4C illustrates a method for performing a read operation according to an embodiment, according to an embodiment.

FIG. 4C illustrates a method for performing a read operation according to an embodiment. In step 480, guest operating system 208 receives a read operation from one of applications 206. For example, such an application may request that data be read from a file residing on virtual disk 300. Upon receipt of the read operation, guest operating system 208 may access metadata data structures of the guest file system, such as a file descriptor (e.g., inode, etc.) stored in the guest file system for the file relating to the read operation to identify a logical data block that needs to be accessed to perform the read operation (step 482). In step 484, guest operating system 208 issues to virtual disk 300 a block-level read instruction to read from the logical data block.

In step 486, hypervisor 214 (via HBA emulator 213, for example) receives the block-level read instruction and, in step 488, consults grain directory 310 and grain tables 312 to identify the GTE that corresponds to the logical data block. It should be recognized that in order to access grain directory 310 and grain tables 312 stored in the virtual disk in step 488, in one embodiment, hypervisor 214 first accesses a file descriptor (e.g., inode, etc.) maintained by the virtual machine file system (e.g., VMFS) for the file representing the virtual disk, thereby obtaining access to references of virtual machine file system data blocks (e.g., of 1 MB block size) in the virtual machine file system that store the contents of the virtual disk (i.e., including the virtual machine file system data blocks storing grain directory 310 and grain tables 312).

In step 490, hypervisor 214 determines if a GDE is allocated for the logical data block and, in step 491, hypervisor 214 determines if a GTE is allocated for the logical data block. If either the GDE or the GTE is not allocated for the logical data block, zeroes are returned to the application in step 492. If both the GDE and the GTE are allocated for the logical data block, step 494 is executed. In step 494, the GTE is examined for a sentinel value. If the GTE contains a sentinel value, the predetermined pattern corresponding to the sentinel value is returned to the application in step 495. If not, in step 496, hypervisor 214 performs the requested block-level read instruction into the grain (e.g., by translating the sector offset to the grain to an offset into a corresponding virtual machine file system data block and ultimately into a corresponding sector-level read instruction through the IO stack of hypervisor 214 and issuing the corresponding sector-level read instruction to the remote storage system).

Figure 5:
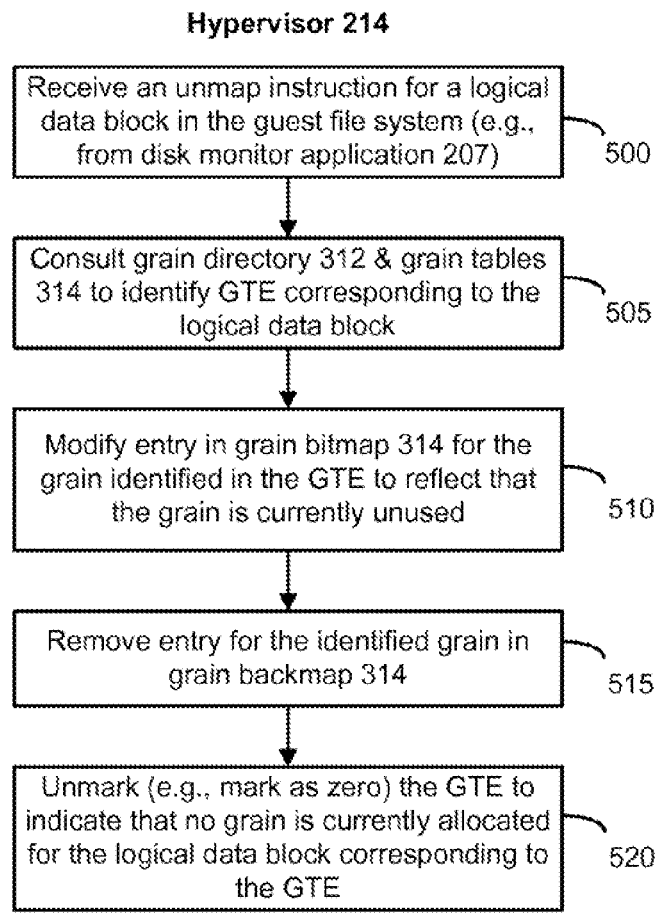
FIG. 5 illustrates a method for performing an unmap operation according to an embodiment, according to an embodiment.

FIG. 5 illustrates a method for performing an unmap operation according to an embodiment. For example, in one embodiment, as previously discussed, disk monitor application 207 may monitor the status of logical data blocks in the guest file system (e.g., by traversing a free block bitmap maintained by the guest file system, etc.) and issue SCSI unmap commands for such logical data blocks for virtual disk 300 (e.g., via guest operating system 208 to HBA emulator 213).

In step 500, hypervisor 214 (e.g., via HBA emulator 213) receives an unmap command for a logical data block in the guest file system. In step 505, hypervisor 214 consults grain directory 312 and grain tables 314 to identify the GTE corresponding to the logical data block. The remaining steps, steps 510, 515, and 520 are carried out in an atomic manner. In step 510, hypervisor 214 modifies the entry in grain bitmap 314 for the grain identified in the GTE to reflect that the grain is currently unused. In step 515, hypervisor 214 also removes an entry for the identified grain in grain backmap 316. In step 520, hypervisor 214 zeroes out or otherwise unmarks the GTE to indicate that no grain is currently allocated for the logical data block corresponding to the GTE.

In an alternative embodiment, step 520 is not performed. Instead, hypervisor 214 retains the mapping of the grain (now indicated as unused) to the GTE. As such, on a subsequent re-allocation and/or write operation to the logical data block corresponding to the GTE, the mapped grain can be re-used by hypervisor 214 if the grain has not been re-allocated to a different GTE in the meanwhile. For such an alternative embodiment, FIG. 4A may be correspondingly modified as depicted in FIG. 4B to include additional steps between steps 425 and 430. As depicted in FIG. 4B, in step 426, hypervisor 214 checks whether the existing grain referenced in the GTE is allocated to another GTE by consulting grain backmap 316. If grain backmap 316 includes an entry for the grain that indicates a different GTE, then the grain was re-allocated to the different GTE and hypervisor 214 moves to step 435 to select a new desirable grain. If, however, grain backmap 316 does not include an entry for the grain or the entry indicates the same GTE as identified in step 420, then in step 427, hypervisor consults the grain's entry in grain bitmap 314 to determine whether the grain is currently used or unused. If the grain is currently used, then hypervisor 214 proceeds to step 430. If the grain is currently unused (e.g., due to actions taken in step 510 of FIG. 5), hypervisor 214 is able to re-use the grain and proceeds to step 450 to update the grain's entry in grain bitmap 314 and insert a new entry into grain backmap 316 for the grain.

Figure 6:
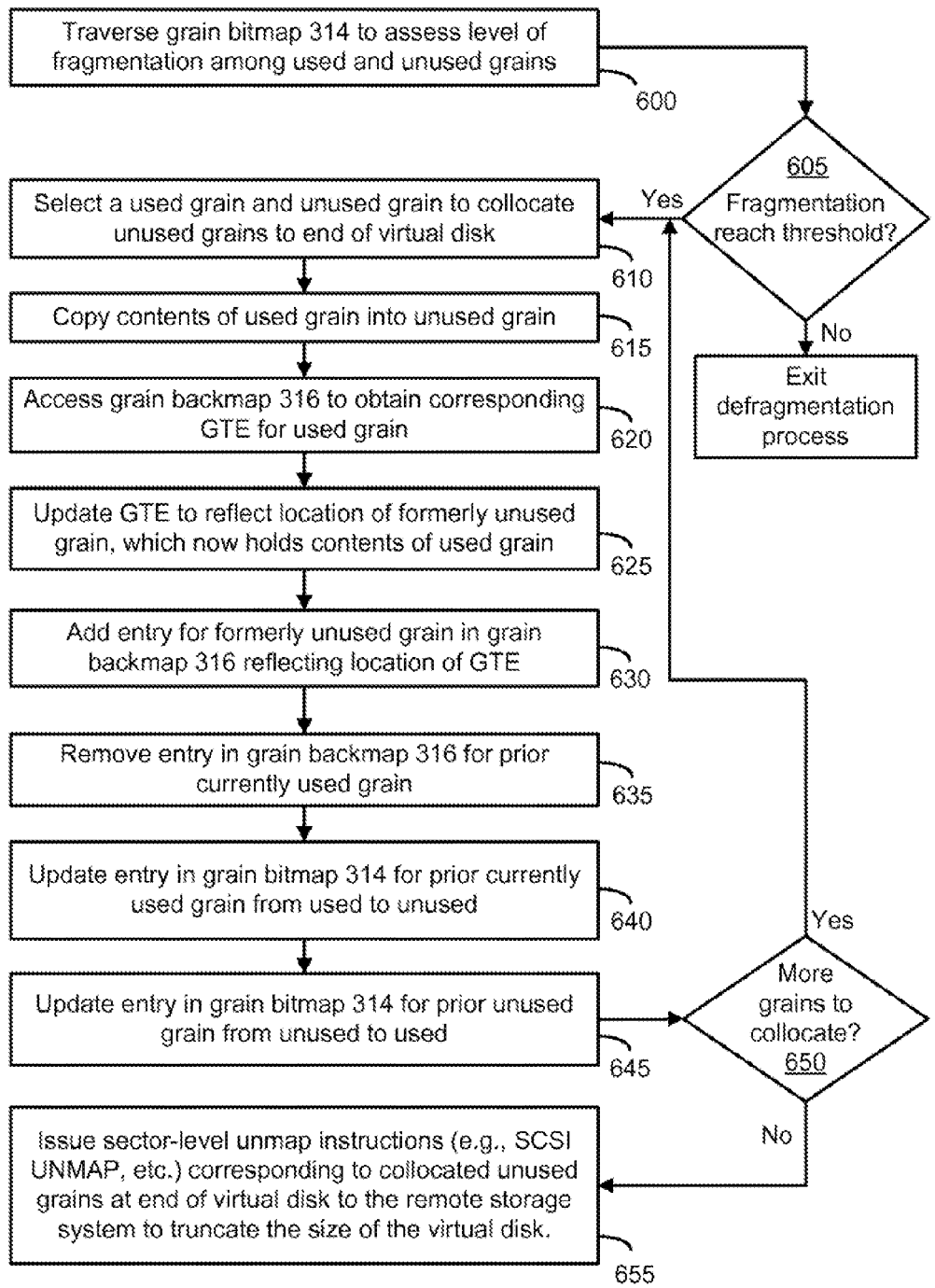
FIG. 6 illustrates a method for defragmenting a virtual disk, according to an embodiment.

FIG. 6 illustrates a method for defragmenting a virtual disk, according to an embodiment. For example, such defragmentation process may be initiated by hypervisor 214 upon completion of an unmap operation triggered by disk monitor application 207, as previously discussed in the context of FIG. 5. In step 600, hypervisor 214 traverses grain bitmap 314 to assess a level of fragmentation among used and unused grains by examining their sector offsets. In step 605, if the level of fragmentation reaches a certain threshold value, then in step 610, hypervisor 214, based on the information in grain bitmap 314, selects a currently used grain and a currently unused grain In one embodiment, a used grain with the highest sector offset is selected as the currently used grain and an unused grain with the lowest sector offset is selected as the currently unused grain. In step 615, hypervisor 214 copies the contents of the currently used grain into the unused grain. In step 620, hypervisor 214 accesses grain backmap 316 to obtain the corresponding GTE for the currently used grain. In step 625, hypervisor 214 updates the GTE to reflect the location (e.g., sector offset) of the formerly unused grain, which now holds the contents of the currently used grain. In step 630, hypervisor 214 now accordingly adds an entry for the formerly unused grain in grain backmap 316 reflecting the location (e.g., sector offsets) of GTE, and, in step 635, removes the entry in grain backmap 316 for the prior currently used grain, since it has now been logically replaced by the prior unused grain and is no longer being currently used. In step 640, hypervisor 314 updates the entry in grain bitmap 314 for the prior currently used grain from used to unused and, in step 645, according update the entry in grain bitmap 314 for the prior unused grain from unused to used. In step 650, hypervisor 214 assesses whether additional used and unused grains may be collocated. If so, then hypervisor 214 returns to step 610. If not, then all grains currently in use have been collocated together and all unused grains have been collocated together to the end of the virtual disk and, in step 655, hypervisor 214 assesses whether the collocated unused grains, in the aggregate, correspond to at least one virtual machine file system data block (e.g., of 1 MB size) of the virtual disk (e.g., the last virtual machine file system data block). If there are sufficient collocated unused grains (e.g., at least 1 MB of unused grains if the virtual machine file system data blocks are 1 MB) to free a virtual file system data block in the virtual disk, then hypervisor 214 removes reference to the freed virtual machine file system block from the file descriptor (or inode) for the virtual disk (e.g., decreasing the size of the virtual disk by 1 MB) and resets (e.g., mark as free) the corresponding entry in the free data block bitmap data structure of the virtual machine file system, thereby freeing the virtual machine file system data block for use by other files stored in the virtual machine file system (e.g., other virtual disks for other virtual machines, etc.). In one embodiment, hypervisor 214 may perform an additional step to issue sector-level unmap commands (e.g., SCSI UNMAP, etc.) that correspond to the sectors comprising the freed virtual machine file system data block to the remote storage system, thereby enabling the remote storage system to reclaim the storage space allocated to the LUN storing the virtual machine file system (e.g., to re-allocate, for example, to other LUNs managed by the remote storage system). This additional step 665 is described in further detail in U.S. Provisional Patent Application No. 61/378,076, filed Aug. 30, 2010 and entitled "Hypervisor Interfaces and Methods for Hardware Space Optimized Device", the entire contents of which are incorporated by reference herein. It should be recognized that alternative embodiments may utilize different techniques to trigger the traversal of grain bitmap 314. In one alternative embodiment, hypervisor 214 periodically traverses grain bitmap 314 (e.g., in accordance with a configuration set by an administrator, etc.) rather than performing such traversal upon completion of an unmap operation. In another alternative embodiment, a defragmentation process may be manually invoked by a system administrator.

Although the inventive concepts disclosed herein are described with reference to specific implementations, many other variations are possible. For example, although the embodiments described herein refer to data block sizes of 4 KB, 1 MB and 512 KB, it should be recognized that alternative embodiments may utilize any various data block sizes consistent with the teachings herein. Further, although embodiments of processes and methods herein are described in terms of certain steps, it should be recognized that such described steps do not connote any particular ordering of such steps and that alternative embodiments may implement such steps in differing orders. Similarly, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, tables, record structures, objects and other data structures may all be implemented in different configurations, redundant, distributed, etc., while still achieving the same results.

The inventive features described herein may be applied in non-virtualized embodiments having applications running on top of an operating system and a filter driver implemented on top of a native file system driver of the operating system. The filter driver in such embodiments may be implemented in software or hardware and is configured to expose and manage thinly-provisioned files in a similar manner as the virtual disk in the virtualized embodiments.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for truncating a file stored in a virtual machine file system supporting execution of virtual machines, wherein the file represents a virtual disk of a virtual machine and the virtual machine includes a guest file system that stores data on the virtual disk, the method comprising:
   identifying a first data block of the virtual disk that is located closer to an end of the virtual disk than a second data block of the virtual disk;
   copying the data of the first data block into a location of the virtual disk that stores the data of the second data block;
   updating an entry in a first data structure so that the entry, which was previously mapped to the first data block, is now mapped to the second data block;
   updating an entry in a second data structure that maintains usage indicators for data blocks in the virtual disk so that a usage indicator for the second data block is changed from unused to used; and
   removing a reference to a virtual machine file system data block in a file descriptor for the file representing the virtual disk that is maintained by the virtual machine file system, thereby decreasing a size of the virtual disk, when none of multiple data blocks of the virtual disk corresponding to and smaller in size than the virtual machine file system data block are indicated as being used by the second data structure.

2. The method of claim 1, further comprising:
   updating an entry in the second data structure so that a usage indicator for the first data block is changed from used to unused.

3. The method of claim 1, further comprising:
   prior to said identifying: traversing entries in the second data structure to assess a level of fragmentation relating to locations of unused data blocks in the virtual disk; and determining that the level of fragmentation exceeds a threshold value.

4. The method of claim 1, wherein said identifying comprises:
   traversing the second data structure to identify an entry corresponding to the first data block and an entry corresponding to the second data block.

5. The method of claim 1, wherein said identifying comprises:
   accessing a third data structure that maintains mappings of the data blocks in the virtual disk to entries in the first data structure to identify the entry for the first data block in the first data structure.

6. The method of claim 5, further comprising:
   adding an entry to the third data structure, wherein the entry maps the second data block to the entry for the first data block in the first data structure; and
   removing an entry from the third data structure corresponding to the first data block.

7. The method of claim 5, wherein each data block in the virtual disk comprises a grain, and the first data structure comprises a plurality of grain tables, the second data structure comprises a grain bitmap, and the third data structure comprises a grain backmap.

8. The method of claim 1, wherein the first data structure and the second data structure are stored in the virtual disk.

9. The method of claim 1, further comprising:
   transmitting an unmap command to a storage device in which the virtual machine file system is stored, wherein the unmap command requests portions of the virtual machine file system corresponding to the virtual machine file system data block be de-allocated from a Logical Unit Number ("LUN") storing the virtual machine file system.

10. The method of claim 1, further comprising:
    freeing an entry corresponding to the virtual machine file system data block in a data structure maintained by the virtual machine file system to track free virtual machine file system data blocks.

11. A non-transitory computer readable storage medium comprising computer-executable instructions, wherein the instructions when executed in a computer that supports execution of a virtual machine configured with a guest file system and a virtual disk, causes the computer to carry out the steps of:
    identifying a first data block of the virtual disk that is located closer to an end of the virtual disk than a second data block of the virtual disk;
    copying the data of the first data block into a location of the virtual disk that stores the data of the second data block;
    updating an entry in a first data structure so that the entry, which was previously mapped to the first data block, is now mapped to the second data block;
    updating an entry in a second data structure that maintains usage indicators for data blocks in the virtual disk so that a usage indicator for the second data block is changed from unused to used; and
    removing a reference to a virtual machine file system data block in a file descriptor for the file representing the virtual disk that is maintained by the virtual machine file system, thereby decreasing a size of the virtual disk, when none of multiple data blocks of the virtual disk corresponding to and smaller in size than the virtual machine file system data block are indicated as being used by the second data structure.

12. The non-transitory computer readable storage medium of claim 11, wherein the instructions when executed in the computer causes the computer to further carry out the steps of:
    updating an entry in the second data structure so that a usage indicator for the first data block is changed from used to unused.

13. The non-transitory computer readable storage medium of claim 11, wherein said identifying comprises:
    accessing a third data structure that maintains mappings of the data blocks in the virtual disk to entries in the first data structure to identify the entry for the first data block in the first data structure.

14. The non-transitory computer readable storage medium of claim 13, wherein the instructions when executed in the computer causes the computer to further carry out the steps of:
    adding an entry to the third data structure, wherein the entry maps the second data block to the entry for the first data block in the first data structure; and
    removing an entry from the third data structure corresponding to the first data block.

15. The non-transitory computer readable storage medium of claim 14, wherein the instructions when executed in the computer causes the computer to further carry out the steps of:

transmitting an unmap command to a storage device in which the virtual machine file system is stored, wherein the unmap command requests portions of the virtual machine file system corresponding to the virtual machine file system data block be de-allocated from a Logical Unit Number ("LUN") storing the virtual machine file system.

16. The non-transitory computer readable storage medium of claim 11, wherein the instructions when executed in the computer causes the computer to further carry out the steps of:
freeing an entry corresponding to the virtual machine file system data block in a data structure maintained by the virtual machine file system to track free virtual machine file system data blocks.

17. A computer system, comprising:
a hardware processing unit,
the hardware processing unit being programmed to support the execution of a virtual machine configured with a guest file system and a virtual disk, and to defragment the virtual disk by carrying out the steps of:
identifying a first data block of the virtual disk that is located closer to an end of the virtual disk than a second data block of the virtual disk,
copying the data of the first data block into a location of the virtual disk that stores the data of the second data block,
updating an entry in a first data structure so that the entry, which was previously mapped to the first data block, is now mapped to the second data block,
updating an entry in a second data structure that maintains usage indicators for data blocks in the virtual disk so that a usage indicator for the second data block is changed from unused to used, and
removing a reference to a virtual machine file system data block in a file descriptor for the file representing the virtual disk that is maintained by the virtual machine file system, thereby decreasing a size of the virtual disk, when none of multiple data blocks of the virtual disk corresponding to and smaller in size than the virtual machine file system data block are indicated as being used by the second data structure.

18. The computer system of claim 17, wherein the hardware processing unit is programmed to further carry out the steps of:
updating an entry in the second data structure so that a usage indicator for the first data block is changed from used to unused.

19. The computer system of claim 17, wherein said identifying comprises:
accessing a third data structure that maintains mappings of the data blocks in the virtual disk to entries in the first data structure to identify the entry for the first data block in the first data structure.

20. The computer system of claim 19, wherein the hardware processing unit is programmed to further carry out the steps of:
adding an entry to the third data structure, wherein the entry maps the second data block to the entry for the first data block in the first data structure; and
removing an entry from the third data structure corresponding to the first data block.

21. The computer system of claim 20, wherein the hardware processing unit is programmed to further carry out the steps of:
transmitting an unmap command to a storage device in which the virtual machine file system is stored, wherein the unmap command requests portions of the virtual machine file system corresponding to the virtual machine file system data block be de-allocated from a Logical Unit Number ("LUN") storing the virtual machine file system.

22. The computer system of claim 20, wherein the hardware processing unit is programmed to further carry out the steps of:
freeing an entry corresponding to the virtual machine file system data block in a data structure maintained by the virtual machine file system to track free virtual machine file system data blocks.

23. A method for managing a file stored in a virtual machine file system supporting execution of virtual machines, wherein the file represents a virtual disk of a virtual machine and the virtual machine includes a guest file system that stores data on the virtual disk, the method comprising:
receiving a command to write data having a pre-determined pattern to a guest file system data block;
updating an entry, which corresponds to the guest file system data block, in a first data structure that maintains mappings of guest file system data blocks to data blocks in the virtual disk so that the entry is not mapped to any data block in the virtual disk and includes a sentinel value representing the pre-determined pattern, without writing the data having the pre-determined pattern to a data block in the virtual disk; and
removing a reference to a virtual machine file system data block in a file descriptor for the file representing the virtual disk that is maintained by the virtual machine file system, thereby decreasing a size of the virtual disk, when none of multiple data blocks of the virtual disk corresponding to and smaller in size than the virtual machine file system data block are indicated as being used by a second data structure that maintains usage indicators for data blocks in the virtual disk.

24. The method of claim 23, wherein the pre-determined pattern is a zero pattern.

25. The method of claim 23, further comprising:
prior to said updating, determining the sentinel value corresponding to the pre-determined pattern.

26. The method of claim 23, further comprising:
prior to said updating, identifying a data block in the virtual disk to which the guest file system data block is mapped, and updating an entry in the second data structure that maintains usage indicators for data blocks in the virtual disk so that a usage indicator for the identified data block is changed from used to unused.

27. The method of claim 26, further comprising:
accessing a third data structure that maintains mappings of the data blocks in the virtual disk to entries in the first data structure and removing an entry in the third data structure corresponding to the identified data block.

28. The method of claim 23, further comprising:
receiving a command to read from the guest file system data block; and
in response to the command, transmitting the pre-determined pattern without reading from a data block in the virtual disk.

* * * * *